G. HALLIDAY.
SAFETY FENDER.
APPLICATION FILED OCT. 19, 1920.
1,368,142.
Patented Feb. 8, 1921.
3 SHEETS—SHEET 1.
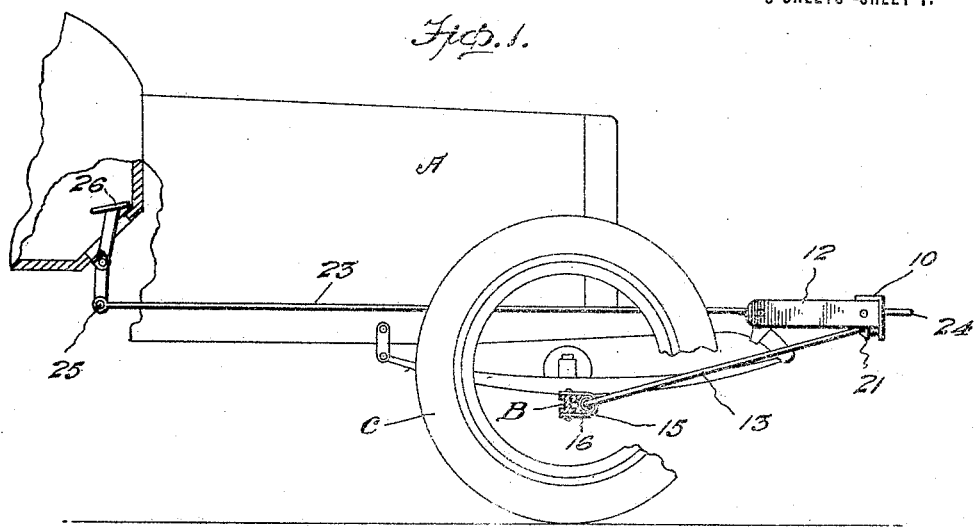
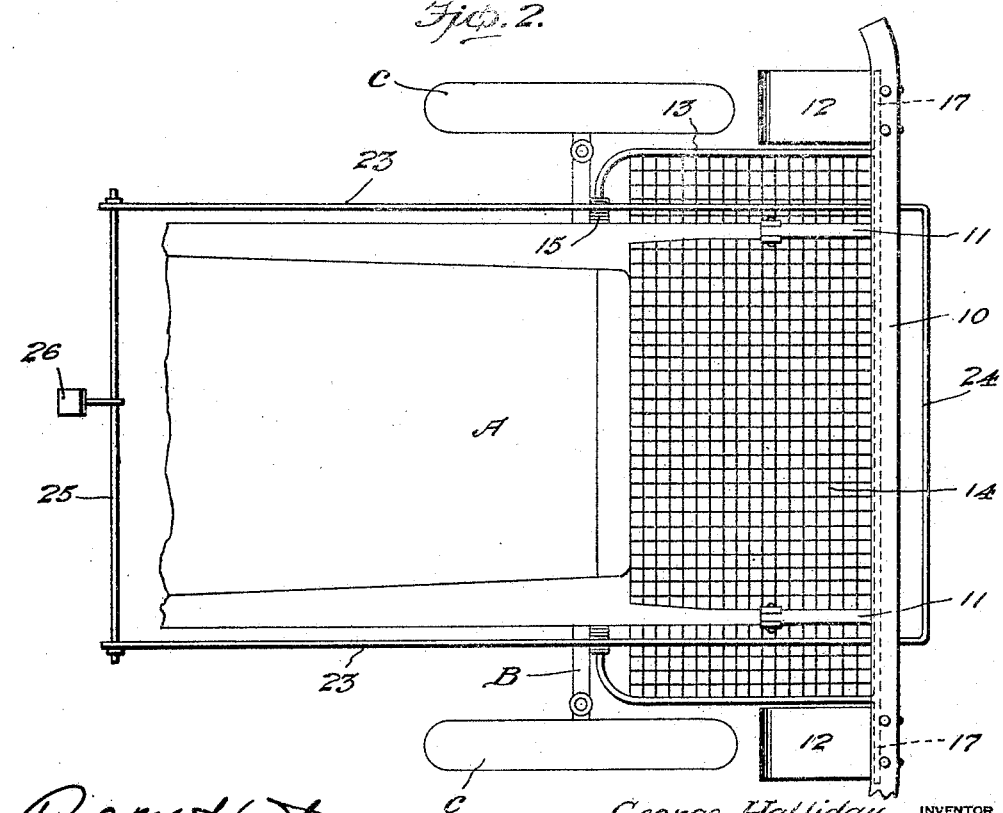
George Halliday INVENTOR
BY Victor J. Evans
ATTORNEY

G. HALLIDAY.
SAFETY FENDER.
APPLICATION FILED OCT. 19, 1920.

1,368,142.

Patented Feb. 8, 1921.
3 SHEETS—SHEET 2.

George Halliday
INVENTOR
BY Victor J. Evans
ATTORNEY

WITNESS:
Paul M. Hunt
J. M. Jester

G. HALLIDAY.
SAFETY FENDER.
APPLICATION FILED OCT. 19, 1920.
1,368,142.
Patented Feb. 8, 1921.
3 SHEETS—SHEET 3.
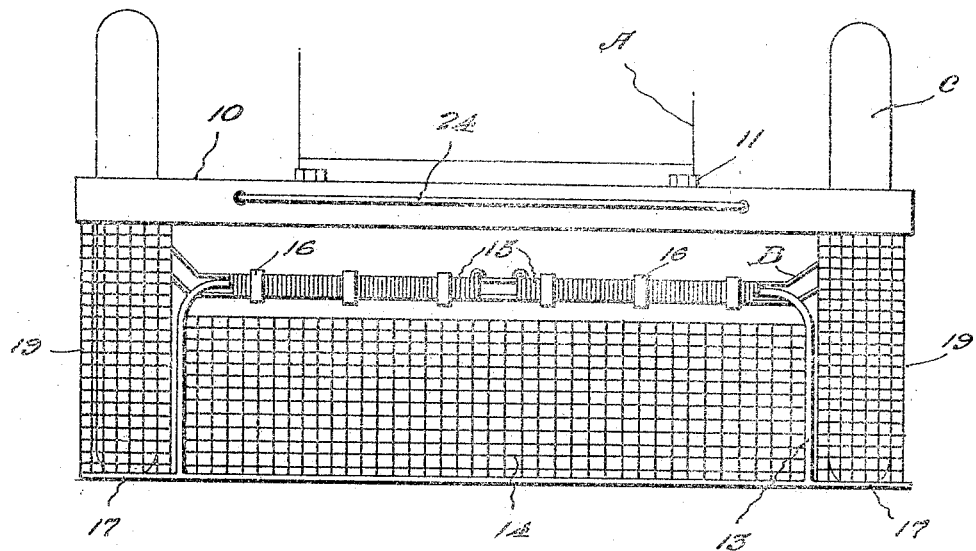
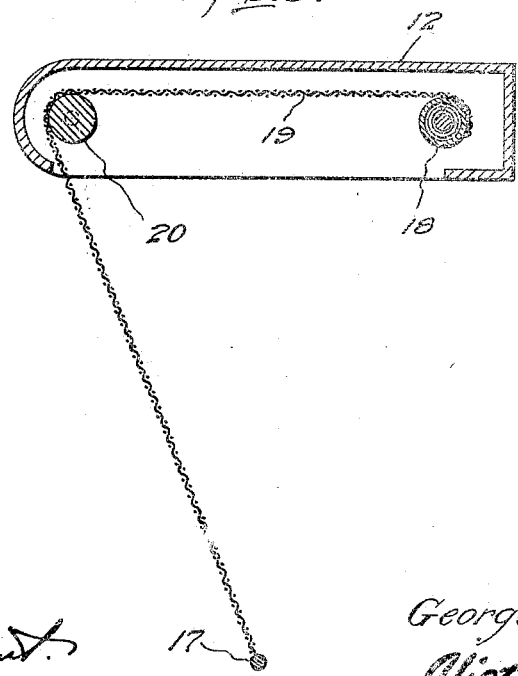
George Halliday
INVENTOR
BY Victor J. Evans
ATTORNEY

UNITED STATES PATENT OFFICE.

GEORGE HALLIDAY, OF ELYRIA, OHIO.

SAFETY-FENDER.

1,368,142.     Specification of Letters Patent.     Patented Feb. 8, 1921.

Application filed October 19, 1920. Serial No. 418,006.

*To all whom it may concern:*

Be it known that I, GEORGE HALLIDAY, a citizen of the United States, residing at Elyria, in the county of Lorain and State of Ohio, have invented new and useful Improvements in Safety-Fenders, of which the following is a specification.

This invention relates to attachments for automobiles, street cars, and the like, and has for its object the provision of a fender associated with a bumper and adapted to be swung downwardly either at the will of the operator or in case of striking a pedestrian so as to prevent a pedestrian from being run over.

An important object is the provision of a device of this character which includes curtain members adapted to extend in front of the wheels, these members operating simultaneously with the main body of the fender.

Another object is the provision in a device of this character of novel means for holding the fender normally inoperative but yet capable of being easily released automatically in the event of striking a pedestrian.

An additional object is the provision of a device of this character which will be simple and inexpensive in construction, highly efficient in use, durable in service, and a general improvement in the art.

With the above and other objects and advantages in view, the invention consists in the details of construction to be hereinafter more fully described and claimed and illustrated in the accompanying drawings in which—

Figure 3:
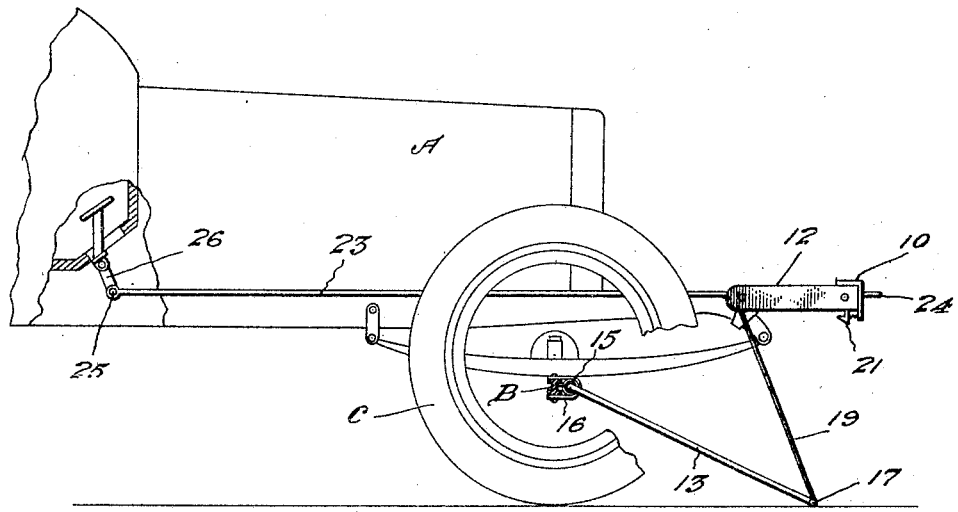
Figure 6:
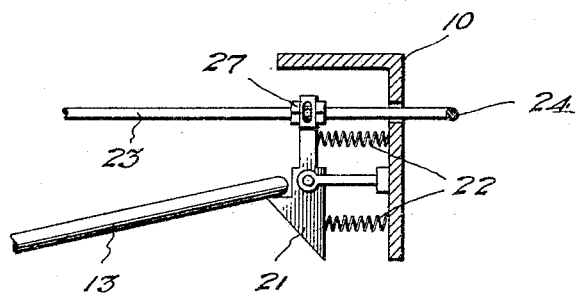

Figure 1 is a side elevation of my device applied to an automobile and showing it in inoperative position, Fig. 2 is a plan view, Fig. 3 is a view similar to Fig. 1, showing the fender in operative position, Fig. 4 is a front elevation thereof, Fig. 5 is a detail sectional view taken through one of the curtain members, and Fig. 6 is a detail sectional view.

Referring more particularly to the drawings, the letter A designates the front portion of an automobile, B designates the front axle, and C designates the front wheels. In carrying out my invention I make use of a bumper 10 which is secured upon the chassis as by means of arms 11. Secured upon the end portions of this bumper are casings 12 for a purpose to be hereinafter described.

Associated with the front axle B is a fender comprising a rectangular frame 13 formed either of solid or tubular rods and which is covered with suitable wire mesh 14. This frame is journaled upon the front axle and is normally urged downwardly into engagement with the ground by coil springs 15 coiled about the frame and each having one end secured thereto and the other end suitably secured to the chassis. A plurality of clips or loops 16 encircle the springs for holding them to the axle. The rod 17 forming the free end of the frame 13 projects laterally beyond the wheels C, as clearly shown.

Journaled within each of the casings 12 is a spring roller 18 upon which is wound a sheet 19 of wire mesh which is trained over an idle roller 20 and which has its free end connected with the lateral projecting end of the rod 17.

Pivoted upon the rear side of the bumper 10 are catches 21 which are held in normal position by springs 22 and the purpose of these catches is to engage the rod 17 and hold the fender structure in normally elevated position.

In order to throw the device into operation, I provide spaced rods 23 slidable transversely of the bumper near the ends thereof and having their forward extremities connected by a rod 24 which extends along the front of the bumper in spaced parallel relation thereto. At their rear ends the rods 23 are connected by the rod 25 which is connected with a suitable foot pedal 26 pivoted within the automobile. The rods 23 are connected with the upper ends of the pivoted catch members 21, as shown at 27.

The operation of the device is as follows: Ordinarily the fender is held elevated by engagement of the rod 17 with the catch members 21 and the sheets or strips 19 are wound upon the rollers 18 and are contained entirely within the casings 12. In case the operator realizes that he is going to strike some one he presses upon the pedal 26 which will result in pulling the rods 23 rearwardly which will cause the catch members 21 to swing forwardly at their lower ends so as to release the rod 17 whereupon the springs 15 will swing the fender 13 downwardly. As the rod 17 has its end portions connected with the strips or sheets 19 these sheets will be pulled from the rollers 18 over the rollers 20 and will be caused to extend downwardly in front of the wheels C. It is not necessary that the device be manually released by the operator as if a pedestrian is struck the rod 24 will be moved rearwardly which will cause rearward movement of the rods 23 in exactly the same manner to release the fender. It is of course understood that the parts may be returned to normal position by pulling the fender 13 upwardly manually.

From the foregoing description and a study of the drawings it will be apparent that I have thus provided a very simply constructed device which will be inexpensive, which may be readily attached to an automobile of any kind, and which will efficiently perform all the functions for which it is intended.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. In combination with a motor vehicle, a fender structure comprising a bumper secured upon the automobile, a fender frame covered with mesh pivoted with respect to the front portion of the vehicle, springs normally tending to swing said frame downwardly, catch means carried by the bumper for holding the fender elevated, and means for releasing said catch means, said catch means comprising a pair of catch members pivoted at the rear of the bumper and engageable by the free end of the frame, and springs holding said catch members in operative position.

2. A device of the character described comprising a frame pivoted upon the front axle of a motor vehicle and covered with mesh, springs urging said frame downwardly, a bumper, catch members pivoted at the rear of said bumper and engaged by the free end of said frame whereby to hold the same elevated, a pair of rods slidable with respect to the bumper and connected with said catch members, a rod connecting the front ends of said rods in advance of the bumper, and pedal means connected with said first named rods whereby to effect movement of the catch members to release the frame.

3. A device of the character described comprising a frame pivoted upon the front axle of a motor vehicle and covered with mesh, springs urging said frame downwardly, a bumper, catch members pivoted at the rear of said bumper and engaged by the free end of said frame whereby to hold the same elevated, a pair of rods slidable with respect to the bumper and connected with said catch members, a rod connecting the front ends of said rods in advance of the bumper, pedal means connected with said first named rods whereby to effect movement of the catch members to release the frame, spring rollers carried by the bumper, and strips of mesh on said rollers and connected with said frame.

4. A device of the character described comprising a frame pivoted upon the front axle of a motor vehicle and covered with mesh, springs urging said frame downwardly, a bumper, catch members pivoted at the rear of said bumper and engaged by the free end of said frame whereby to hold the same elevated, a pair of rods slidable with respect to the bumper and connected with said catch members, a rod connecting the front ends of said rods in advance of the bumper, pedal means connected with said first named rods whereby to effect movement of the catch members to release the frame, a pair of casings carried by the bumper, a spring roller within each casing, a side roller at the open end of each casing, and strips of mesh wound upon said spring rollers, trained over said idle rollers and connected with the free end of said frame.

In testimony whereof I affix my signature.

GEORGE HALLIDAY.